(12) United States Patent
Wu et al.

(10) Patent No.: US 6,512,615 B2
(45) Date of Patent: *Jan. 28, 2003

(54) METHOD AND APPARATUS FOR WAVELENGTH MULTIPLEXING/ DEMULTIPLEXING

(75) Inventors: Kuang-Yi Wu, Plano, TX (US); Jian-Yu Liu, Garland, TX (US)

(73) Assignee: Chorum Technologies LP, Richardson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/741,270

(22) Filed: Dec. 18, 2000

(65) Prior Publication Data

US 2002/0030866 A1 Mar. 14, 2002

Related U.S. Application Data (63) Continuation of application No. 09/274,270, filed on Mar. 22, 1999, now Pat. No. 6,163,393, which is a continuation-in-part of application No. 09/240,550, filed on Jan. 29, 1999, now Pat. No. 5,978,116, said application No. 09/274,270, is a continuation-in-part of application No. 09/156,211, filed on Sep. 17, 1998, now Pat. No. 6,285,478, which is a continuation-in-part of application No. 09/048,557, filed on Mar. 26, 1998, now Pat. No. 6,208,442, which is a continuation of application No. 08/739,424, filed on Oct. 29, 1996, now Pat. No. 5,867,291.

(51) Int. Cl.[7] .................................................. H04J 14/02
(52) U.S. Cl. ........................................ 359/127; 359/128
(58) Field of Search ................................ 359/127, 128, 359/129, 130, 131

(56) References Cited

U.S. PATENT DOCUMENTS

| | | | |
|---|---|---|---|
| 3,391,970 A | 7/1968 | Sincerbox | 350/150 |
| 3,500,102 A | 3/1970 | Crost et al. | 313/109 |
| 3,503,670 A | 3/1970 | Kosanke et al. | 350/150 |
| 3,719,414 A | 3/1973 | Wentz | 350/150 |
| 3,892,468 A | 7/1975 | Duguay | 350/96 B |

(List continued on next page.)

FOREIGN PATENT DOCUMENTS

| | | | |
|---|---|---|---|
| EP | 0307244 | 3/1989 | G02F/1/31 |
| EP | 0370410 | 5/1990 | G02B/5/30 |
| JP | 61-97629 | 5/1986 | G02F/1/31 |
| JP | 61-097629 | 5/1986 | G02F/1/31 |
| JP | 01-140134 | 6/1989 | G02F/1/31 |

(List continued on next page.)

OTHER PUBLICATIONS

Ammann, "Synthesis of Electro–Optic Shutters having a Prescribed Transmission vs Voltage Characteristic", Journal of the Optical Society of America (vol. 56, No. 8, pp. 1081–1088. Aug. 1966).

Harris et al., "Optical Network Synthesis Using Birefringent Crystals. *I. Synthesis of Lossless Networks of Equal–Length Crystals", Journal of the Optical Society of America (vol. 54, No. 10, pp. 1267–1279, Oct. 1964).

(List continued on next page.)

*Primary Examiner*—Leslie Pascal
(74) *Attorney, Agent, or Firm*—Baker Botts L.L.P.

(57) ABSTRACT

A wavelength division multiplexing/demultiplexing device is presented utilizing a polarization-based filter to obtain a flat-top filter response which can be utilized to create a flat-top slicer which separates out odd and even wavelengths, or upper and lower channels of an input signal. The polarization-based filter provides superior peak flatness and isolation for narrow channel spacings over what can be obtained in traditional interferometric devices. The flat-top slicer can be used as the first stage of a cascade of WDM devices in which following stages can be based on polarization-based filters or traditional interferometric WDM devices, which are adequate due to the increased channel spacing obtained in the first stage of the cascade.

52 Claims, 6 Drawing Sheets

U.S. PATENT DOCUMENTS

| | | | |
|---|---|---|---|
| 3,920,983 A | 11/1975 | Schlafer et al. | 250/199 |
| 4,129,357 A | 12/1978 | Title | 350/157 |
| 4,227,208 A | 10/1980 | Takanashi et al. | 358/55 |
| 4,359,268 A | 11/1982 | Kondo | 350/377 |
| 4,461,543 A | 7/1984 | McMahon | 350/383 |
| 4,464,022 A | 8/1984 | Emkey | 350/377 |
| 4,514,046 A | 4/1985 | Carlsen et al. | 350/385 |
| 4,566,761 A | 1/1986 | Carlsen et al. | |
| 4,575,193 A | 3/1986 | Greivenkamp, Jr. | 350/401 |
| 4,626,897 A | 12/1986 | Sato et al. | 350/401 |
| 4,650,289 A | 3/1987 | Kuwahara | 358/44 |
| 4,671,613 A | 6/1987 | Buhrer | 350/375 |
| 4,678,287 A | 7/1987 | Buhrer | 350/404 |
| 4,685,773 A | 8/1987 | Carlsen et al. | |
| 4,744,075 A | 5/1988 | Buhrer | 370/3 |
| 4,745,591 A | 5/1988 | Foley | 370/3 |
| 4,772,104 A | 9/1988 | Buhrer | 350/403 |
| 4,919,522 A | 4/1990 | Nelson | |
| 4,987,567 A | 1/1991 | Buhrer | 370/3 |
| 5,009,477 A | 4/1991 | Alferness et al. | 350/96.15 |
| 5,033,830 A | 7/1991 | Jameson | 350/403 |
| 5,040,896 A | 8/1991 | Moslehi | 356/351 |
| 5,111,321 A | 5/1992 | Patel | 359/92 |
| 5,136,671 A | 8/1992 | Dragone | |
| 5,204,771 A | 4/1993 | Koga | 359/281 |
| 5,231,521 A | 7/1993 | Johnson et al. | 359/93 |
| 5,243,455 A | 9/1993 | Johnson et al. | 359/93 |
| 5,262,892 A | 11/1993 | Nakamura | 359/484 |
| 5,274,679 A | 12/1993 | Abe et al. | 375/117 |
| 5,299,056 A | 3/1994 | Kurata et al. | 359/341 |
| 5,317,655 A | 5/1994 | Pan | 385/11 |
| 5,319,483 A | 6/1994 | Krasinski et al. | 359/113 |
| 5,341,444 A | 8/1994 | Henry et al. | 385/11 |
| 5,345,174 A | 9/1994 | Kimmich et al. | 324/309 |
| 5,351,317 A | 9/1994 | Weber | 385/3 |
| 5,355,249 A | 10/1994 | Souda et al. | 359/341 |
| 5,363,228 A | 11/1994 | DeJule et al. | |
| 5,381,250 A | 1/1995 | Meadows | |
| 5,414,540 A | 5/1995 | Patel et al. | 359/39 |
| 5,414,541 A | 5/1995 | Patel et al. | |
| 5,444,725 A | 8/1995 | Zirngibl | 372/20 |
| 5,463,493 A | 10/1995 | Shah | 359/312 |
| 5,481,402 A | 1/1996 | Cheng et al. | 359/498 |
| 5,488,500 A | 1/1996 | Glance | |
| 5,499,132 A | 3/1996 | Tojo et al. | 359/281 |
| 5,574,596 A | 11/1996 | Cheng | 359/484 |
| 5,579,420 A | 11/1996 | Fukushima | 358/11 |
| 5,596,661 A | 1/1997 | Henry et al. | |
| 5,600,742 A | 2/1997 | Zirngibl | 385/37 |
| 5,606,439 A | 2/1997 | Wu | |
| 5,619,359 A | 4/1997 | Redmond et al. | 359/117 |
| 5,680,490 A | 10/1997 | Cohen et al. | |
| 5,694,233 A | 12/1997 | Wu et al. | |
| 5,710,655 A | 1/1998 | Rumbaugh et al. | 359/249 |
| 5,718,226 A | 2/1998 | Riza | 128/660.01 |
| 5,724,165 A | 3/1998 | Wu | 359/117 |
| 5,729,377 A | 3/1998 | Bergmann | 359/249 |
| 5,751,384 A | 5/1998 | Sharp | 349/18 |
| 5,771,120 A | 6/1998 | Bergmann | 359/484 |
| 5,781,293 A | 7/1998 | Padgett et al. | 356/346 |
| 5,809,190 A | 9/1998 | Chen | |
| 5,923,472 A | 7/1999 | Bergmann | 359/618 |
| 5,930,028 A | 7/1999 | Bergmann | 359/303 |
| 5,930,039 A | 7/1999 | Li et al. | 359/484 |
| 5,978,529 A | 11/1999 | Taga et al. | 385/24 |
| 6,002,512 A | 12/1999 | Bergmann et al. | 359/281 |
| 6,005,995 A | 12/1999 | Chen et al. | 385/24 |
| 6,040,942 A | 3/2000 | Bergmann | 359/487 |
| 6,055,101 A | 4/2000 | Bergmann et al. | 359/484 |
| 6,067,178 A | 5/2000 | Zheng | 359/124 |
| 6,091,543 A | 7/2000 | Bergmann | 359/495 |
| 6,097,517 A | 8/2000 | Okayama | 359/124 |
| 6,115,401 A | 9/2000 | Scobey et al. | 372/100 |
| 6,125,221 A | 9/2000 | Bergmann et al. | 385/33 |
| 6,130,971 A | 10/2000 | Cao | 385/31 |
| 6,134,031 A | 10/2000 | Nishi et al. | 359/15 |
| 6,141,130 A | 10/2000 | Ip | 359/179 |
| 6,163,393 A * | 12/2000 | Wu et al. | 359/122 |
| 6,173,092 B1 | 1/2001 | Bergmann | 385/16 |
| 6,208,444 B1 * | 3/2001 | Wong et al. | 359/122 |

FOREIGN PATENT DOCUMENTS

| | | | |
|---|---|---|---|
| JP | 1140134 | 6/1989 | G02F/1/31 |
| JP | 2007026 | 1/1990 | G02F/1/31 |
| JP | 02-007026 | 1/1990 | G02F/1/31 |
| JP | 3276119 | 12/1991 | G02F/27/28 |
| JP | 03-276199 | 12/1991 | G02B/27/28 |
| JP | 4128715 | 4/1992 | G02F/1/09 |
| JP | 04-128715 | 4/1992 | G02F/1/09 |
| JP | 06-181352 | 6/1994 | H01S/3/094 |
| JP | 6-181352 | 6/1994 | G02F/1/35 |
| WO | WO 98/19415 | 5/1998 | H04J/14/00 |

OTHER PUBLICATIONS

Senior et al., "Devices for Wavelength Multiplexing and Demultiplexing", IEE Proceedings (vol. 136, Pt. J, No. 3, Jun. 1989).

Nosu et al., "Optical FDM Transmission Technique", Journal of Lightwave Technology (vol. LT–5, No. 9, Sep. 1987).

Inoue et al., "A Four–Channel Optical Waveguide Multi/Demultiplexer for 5–GHz Spaced Optical FDM Transmission", Journal of Lightwave Technology (vol. 6, No. 2, Feb. 1988).

Chung et al., "Analysis of a Tunable Multichannel Two–Mode–Interference Wavelength Division Multiplexer/Demultiplexer", Journal of Lightwave Technology (vol. 7, No. 5, May 1989).

Damask et al., "Wavelength–Division Multiplexing using Channel–Dropping Filters", Journal of Lightwave Technology (vol. 11, No. 3, Mar. 1993).

Dingel and Izutsu, "Multifunction Optical Filter with a Michelson–Gires–Tournois Interferometer for Wavelength–Division–Multiplexed Network System Applications", Optical Letters (vol. 23, p. 1099, Jul. 1998).

P. Melman et al., Tunable Birefringent Wavelength–Division Multiplexer/Demultiplexer, Electronics Letters, The Institution of Electrical Engineers Publishing & Information Services.

W. J. Carlsen et al., Flat Passband Birefringent Wavelength–Division Multiplexers.

Yohji Fujii et al., Wavelength–Division Multi/Demultiplexer Utilizing Optically Active Crystals, Journal of Lightwave Technology, Jul. 1990, pp. 1051–1054, vol. 8, No. 7, IEEE.

Hideki Ishio et al., Review and Status of Wavelength–Division–Multiplexing Technology and Its Application, Journal Lightwave Technology, Aug. 1984, pp. 448–463, vol. LT–2, No. 4, IEEE.

H. F. Mahlein, Fiber–Optic Communication in the Wavelength–Division Multiplex Mode, Fiber and Integrated Optics, 1983, pp. 339–373, vol. 4, No. 4, Crane, Russak & Co., Inc.

* cited by examiner

METHOD AND APPARATUS FOR WAVELENGTH MULTIPLEXING/ DEMULTIPLEXING

RELATED APPLICATIONS

The present application is a continuation of the Applicants' U.S. patent application Ser. No. 09/274,270, entitled "Method And Apparatus For Wavelength Multi-Plexing/ Demultiplexing", filed on Mar. 22, 1999, now U.S. Pat. No. 6,163,393 which is a continuation-in-part of U.S. patent application Ser. No. 09/240,550, entitled "Optical Wavelength Router", filed on Jan. 29, 1999, now U.S. Pat. No. 5,978,116, issued on Nov. 2, 1999, which is a continuation of U.S. patent application Ser. No. 08/739,424, filed on Oct. 29, 1996, now U.S. Pat. No. 5,867,291, issued on Feb. 2, 1999. The parent application, U.S. patent application Ser. No. 09/274,270 (U.S. Pat. No. 6,163,393) is also a continuation-in-part of U.S. patent application Ser. No. 09/156,211 entitled "Programmable Optical Add/Drop Multiplexer," filed on Sept. 17, 1998, now U.S. Pat. No. 6,285,878 and U.S. patent application Ser. No. 09/048,557, entitled "Programmable Optical Multiplexer," filed on Mar. 26, 1998 now U.S. Pat. No. 6,208,442.

GOVERNMENT INTERESTS

The invention was made with Government support under Contract DARPA II: DAAH01-97-C-R308 awarded by U.S. Army Missile Command, AMSMI-AC-CRAY, Redstone Arsenal, AL 35898. The Government has certain rights in the invention.

BACKGROUND OF THE INVENTION

1. Field of the Invention

The present invention relates generally to the field of optical communications. More specifically, the present invention discloses a method and apparatus for wavelength multiplexing and demultiplexing.

2. Background of the Invention

Wavelength division multiplexing is a commonly used technique that allows the transport of multiple optical signals, each at a slightly different wavelength, on an optical fiber. The ability to carry multiple signals on a single fiber allows that fiber to carry a tremendous amount of traffic, including data, voice, and even digital video signals. As an example, the use of wavelength division multiplexing permits a long distance telephone company to carry thousands or even millions of phone conversations on one fiber. By using wavelength division multiplexing it is possible to effectively use the fiber at multiple wavelengths, as opposed to the costly process of installing additional fibers.

In wavelength division multiplexing techniques, multiple wavelengths can be carried within a specified bandwidth. It is advantageous to carry as many wavelengths as possible in that bandwidth. International Telecommunications Union (ITU) Draft Recommendation G.mcs, incorporated herein by reference, proposes a frequency grid which specifies various channel spacings including 100 GHz and 200 GHz. It would be advantageous to obtain 50 GHz spacing. Separating and combining wavelengths with these close spacings requires optical components which have high peak transmission at the specified wavelengths and which can provide good isolation between separated wavelengths.

One technique which has been developed to accomplish the demultiplexing of closely spaced wavelengths is to cascade a series of wavelength division demultiplexing devices, each device having different wavelength separating characteristics. A typical application involves cascading an interferometric device such as an arrayed waveguide device having a narrow spacing of transmission peaks (e.g., 50 GHz) with a second interferometric device which has a coarser spacing and correspondingly broader transmission peaks (e.g., 100 GHz spacing). The cascade of devices provides the separation of wavelengths by subdividing the wavelengths once in the first device, typically into a set of odd and even channels, and then separating wavelengths in the subsets in following devices in the cascade.

Arrayed waveguide (AWG), fused biconical taper (FBT), fiber Bragg grating (FBG), diffraction grating, and other interferometric wavelength demultiplexing devices can be constructed to have the appropriate characteristics for the first or second stage devices in the cascade. However, traditional interferometric devices have the characteristic that as the spacing of the channels is decreased, the transmission peaks become narrower, and are less flat over the wavelength region in the immediate vicinity of each peak than a device with wider channel spacings. As a result, when using a traditional device in the first stage of a cascade, the transmission peaks may not have a high degree of flatness, and any drift or offset of a wavelength from its specified value may result in significant attenuation of that wavelength. In addition, the isolation between wavelengths is frequently unsuitable with conventional interferometric devices and can result in unacceptable crosstalk between channels. With increasing numbers of wavelengths and the close wavelength spacing which is utilized in dense wavelength division multiplexing systems, attenuation and crosstalk must be closely controlled to meet the system requirements and maintain reliable operations. As an example, 40 or 80 wavelengths can be generated using controllable wavelength lasers, with transmission signals modulated onto each laser. It is desirable to be able to multiplex and demultiplex these channels onto one single optical fiber. Although the lasers can be controlled and the wavelengths stabilized to prevent one channel from drifting into another, there is always some wavelength drift which will occur.

In a cascade architecture, the first stage of demultiplexing, or the last stage of multiplexing are where good peak flatness and high isolation are required in order to allow the separation/combining of closely spaced wavelengths.

For the foregoing reasons, there is a need for a wavelength division multiplexing/demultiplexing device which tolerates wavelength drift, maintains a high degree of isolation between channels, and is able to separate/combine large numbers of wavelengths.

SUMMARY OF THE INVENTION

The present invention encompasses a method and apparatus for wavelength division multiplexing/demultiplexing in which a cascade is formed between a polarization-based wavelength multiplexing/demultiplexing device and a second wavelength multiplexing/demultiplexing device. The polarization-based wavelength division multiplexing/ demultiplexing device has transmission peaks which are substantially flat as a result of the characteristics of a polarization-based filter which is part of the device. In addition, the polarization filter provides a high degree of isolation between adjacent channels. The output of the polarization-based wavelength division multiplexing/ demultiplexing device is received by a second stage of wavelength multiplexing devices which further separates the wavelengths. One advantage of the present invention is that the polarization-based wavelength multiplexing/demultiplexing device has good peak flatness and low crosstalk, and permits separation of closely spaced wavelengths (e.g., 50 GHz spacing). The subsequent devices in the cascade can be based on a number of technologies including arrayed waveguide technology, fused biconical taper technology, diffraction grating technology, fiber Bragg grating technology, interference filter, or can also be polarization-based devices. The subsequent devices are used to separate channels which have been formed into subgroups by the polarization-based wavelength multiplexing/demultiplexing device.

In a preferred embodiment the polarization-based wavelength multiplexer/demultiplexer creates two subsets, one subset containing the odd channels from the input channels, the other subset containing the even channels from the input channels. The second device further separates the wavelengths in the first and second subsets, resulting in a wavelength spacing at the output which is 2N times the wavelength spacing at the input of the polarization-based wavelength multiplexer/demultiplexer. In a preferred embodiment the second stage performs the subsequent demultiplexing operations. In an alternate embodiment multiple stages are used in the cascade to further separate the wavelengths and produce a single channel at the final output.

In an alternate embodiment, the polarization-based wavelength multiplexer/demultiplexer separates an upper band from a lower band. Subsequent stages are used to further separate the channels.

When a large number of channels are present, the polarization-based multiplexer/demultiplexer can be utilized to separate the channels into groups, and subsequent stages can be used to continue the multiplexing/demultiplexing process. In a preferred embodiment, when used as a demultiplexer, the present invention separates an input signal into two groups of channels, the even channels and the odd channels. A subsequent stage based on arrayed waveguide (AWG) technology performs the final multiplexing, resulting in individual channels at the output.

In a preferred embodiment the polarization-based wavelength division multiplexing/demultiplexing device is based on a polarization routing device which receives an optical signal carrying multiple channels at various wavelengths, separates the signal into vertical and horizontal polarizations, converts one of the polarizations to be identical to the other polarization, and performs filtering based on the wavelength of the signal, with the polarization of the output being dependent on the wavelength. A polarization routing stage routes light to a particular output depending on its polarization, and a polarization conversion and recombination stage combines the polarizations at each output to form an output signal.

In a preferred embodiment the polarization filter is composed of calcite birefringent crystal plates. A polarization mode dispersion compensator can be utilized in the device to reduce the polarization dispersion.

In the present invention the transmission function obtained in the first stage of a cascade demultiplexer has Fourier components such that the transmission function is substantially flatter and has steeper roll-off from the peaks than the transmission function in the second or subsequent stages. The additional Fourier components in the first stage result in a substantially square transfer function as compared to the second stage transfer function. In a preferred embodiment, the first stage transfer function is realized through the use of a polarization filter, which enables angle to be used as a variable in addition to path length, permitting the incorporation of the additional Fourier components necessary to make a square wave transfer function.

One advantage of the present invention is that it allows the use of low cost interferometric devices in second and higher stages of a wavelength division multiplexing/demultiplexing device while achieving good flatness and low crosstalk through the use of a polarization-based first stage.

In a preferred embodiment a large number of channels (e.g. 40 or 80) with 100 GHz spacing enter the device and are separated according to even and odd channels by a polarization-based first stage device with a spacing of 200 GHz. The second stage device is an arrayed waveguide device which separates the channels into individual channels which appear on the outputs, and which can be individually received by a telecommunications receiving device which is not wavelength selective.

These and other features and objects of the invention will be more fully understood from the following detailed description of the preferred embodiments which should be read in light of the accompanying drawings.

BRIEF DESCRIPTION OF THE DRAWINGS

The accompanying drawings illustrate the embodiments of the present invention and, together with the description, serve to explain the principles of the invention.

DETAILED DESCRIPTION OF THE INVENTION

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

When used herein, the term multiplexer/demultiplexer refers to a device which can be used to either combine or separate wavelengths. However, such a definition does not preclude the use of the device for one function only. In addition, nonreciprocal elements can be added, precluding use of the device for one of the functions of multiplexing or demultiplexing, although the features and functionality of multiplexer/demultiplexer remain the same in the direction of use.

When used in a cascade, the term first stage refers to the first stage of the cascade in a demultiplexing configuration, where closely spaced wavelengths enter the system and are separated. When used in a multiplexing configuration, the last stage of the system performs the final multiplexing of the wavelengths, and corresponds to the first stage of the demultiplexer. When used herein the term first stage refers to the first stage in a demultiplexing operation and to the last stage in a multiplexing operation. The term flat-top slicer refers to a wavelength multiplexing/demultiplexing device with a substantially square input port to output port transmission function.

With reference to the drawings, in general, and FIGS. 1 through 6 in particular, the apparatus of the present invention is disclosed.

Figure 1:
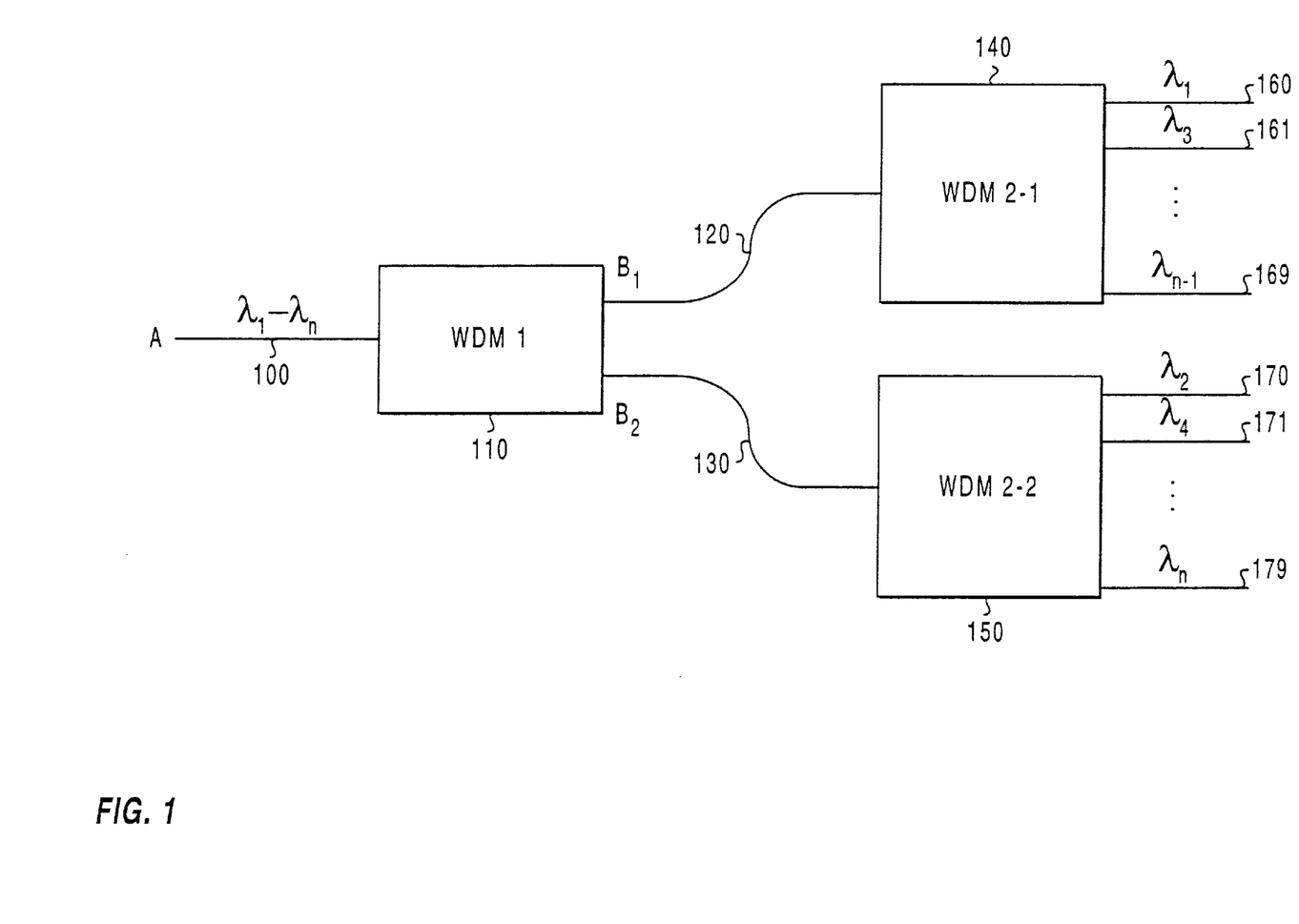
FIG. 1 illustrates the concept of wavelength slicing and cascading of WDM filters.

FIG. 1 illustrates a cascade of wavelength division multiplexers (WDMs). A number of channels at wavelengths $\lambda_1$ through $\lambda_n$ appear at input port A 100 which is part of WDM 1 110. In a preferred embodiment WDM 1 110 separates out a first subset of odd numbered wavelengths which include $\lambda_1$ through $\lambda_{n-1}$ which appear on output port $B_1$ 120. Similarly, WDM 1 110 separates out a second subset of even numbered wavelengths which include $\lambda_2$ through $\lambda_n$ which appear on port $B_2$ 130. In an alternate embodiment the first set of wavelengths includes $\lambda_1$ through $\lambda_{n/2}$ and the second set of wavelengths includes $\lambda_{[(n/2)+1]}$ through $\lambda_n$.

Port $B_1$ 120 is coupled to WDM 2-1 140 which further separates out wavelength $\lambda_1$ which appears at port 160, wavelength $\lambda_3$ which appears at port 161, and remaining odd wavelengths through $\lambda_{n-1}$ which appears on port 169. Similarly, Port $B_2$ 130 is coupled to WDM 2-2 150 which further separates out wavelength $\lambda_2$ which appears at port 170, wavelength $\lambda_4$ which appears at port 171, and remaining even wavelengths through $\lambda_n$ which appears on port 179.

In an alternate embodiment the lower half of the wavelengths at input port A 100 are separated by WDM 2-1 140 and the upper half of the wavelengths at input port A 100 are separated by WDM 2-2 150.

Traditional interferometric devices suffer from the problem that as the transmission peak spacing is decreased, the flatness at the top of the transmission peak is reduced, due to the fact that the bandwidth at the top of the peak is reduced as a consequence of having more closely spaced peaks. While many WDM systems require that the variations in transmission be less than 0.5 dB over 0.3 nm or better, it is not generally possible to obtain such flatness using traditional interferometric devices. As a result, if there is any wavelength drift of any of the input signals, there will be subsequent attenuation due to the fact that the signal is no longer at a transmission peak. In addition, the isolation between signals at adjacent wavelengths can be unacceptable due to the fact that the attenuation at the bottom of the transmission curve is not low enough over a wide enough wavelength region. This reduced isolation can result in unacceptable crosstalk between channels.

Figure 2:
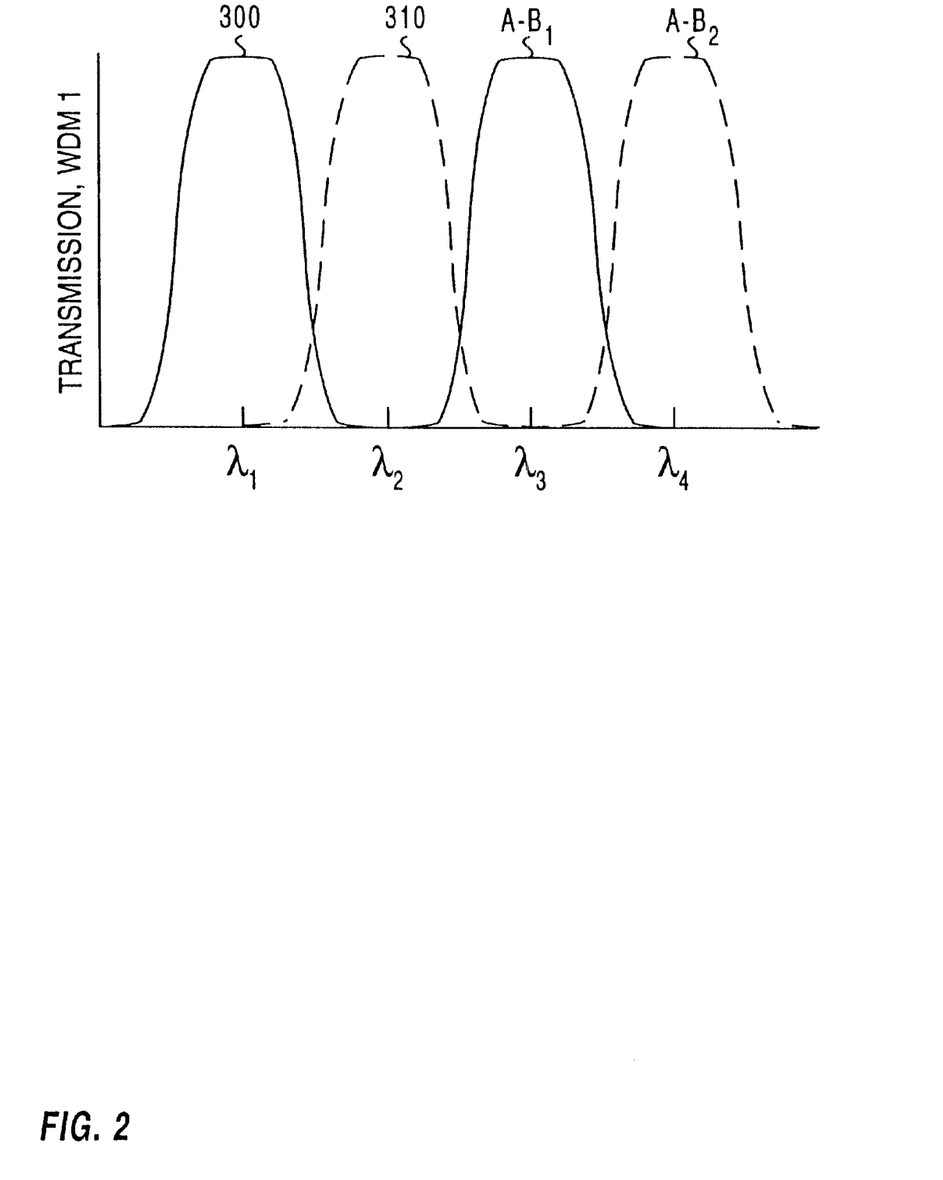
FIG. 2 illustrates the flat-top slicer spectral response.

The present invention avoids the aforementioned problems through the use of a flat-top slicer as WDM 1 110. The flat-top slicer provides a wavelength separating function which has adequate flatness and isolation. The transmission function for the flat-top slicer is illustrated in FIG. 2. Solid line 300 represents the transmission from port A 100 to port $B_1$ 120 in a flat-top slicer while dotted line 310 represents the transmission from port A 100 to port $B_2$ 130 in a flat top slicer.

In a preferred embodiment the flat-top slicer is realized based on a polarization-based wavelength multiplexing/demultiplexing device containing a polarization filter. Polarization filters provide the ability to obtain a tailored optical response as a function of wavelength and can provide superior performance over non-polarization based filters because they permit the use of polarization angle as well as path length (thickness) as a variable in creating the filter response. Polarization filters are typically embedded in an optical system which subsequently recombines the polarizations to produce a polarization independent device. Polarization filters are well understood by those skilled in the art, and are described in published books and literature, including the book by A. Yariv and P. Yeh entitled "Optical waves in crystals," which is incorporated herein by reference.

For example, the polarization filter can be composed of a plurality of birefringent elements, such as birefringent crystal plates (e.g., calcite or other birefringent crystalline materials). The polarization filter could also be made using a polarization fiber. A polarization mode dispersion compensator can be utilized in the device to reduce the polarization dispersion.

Figure 4:
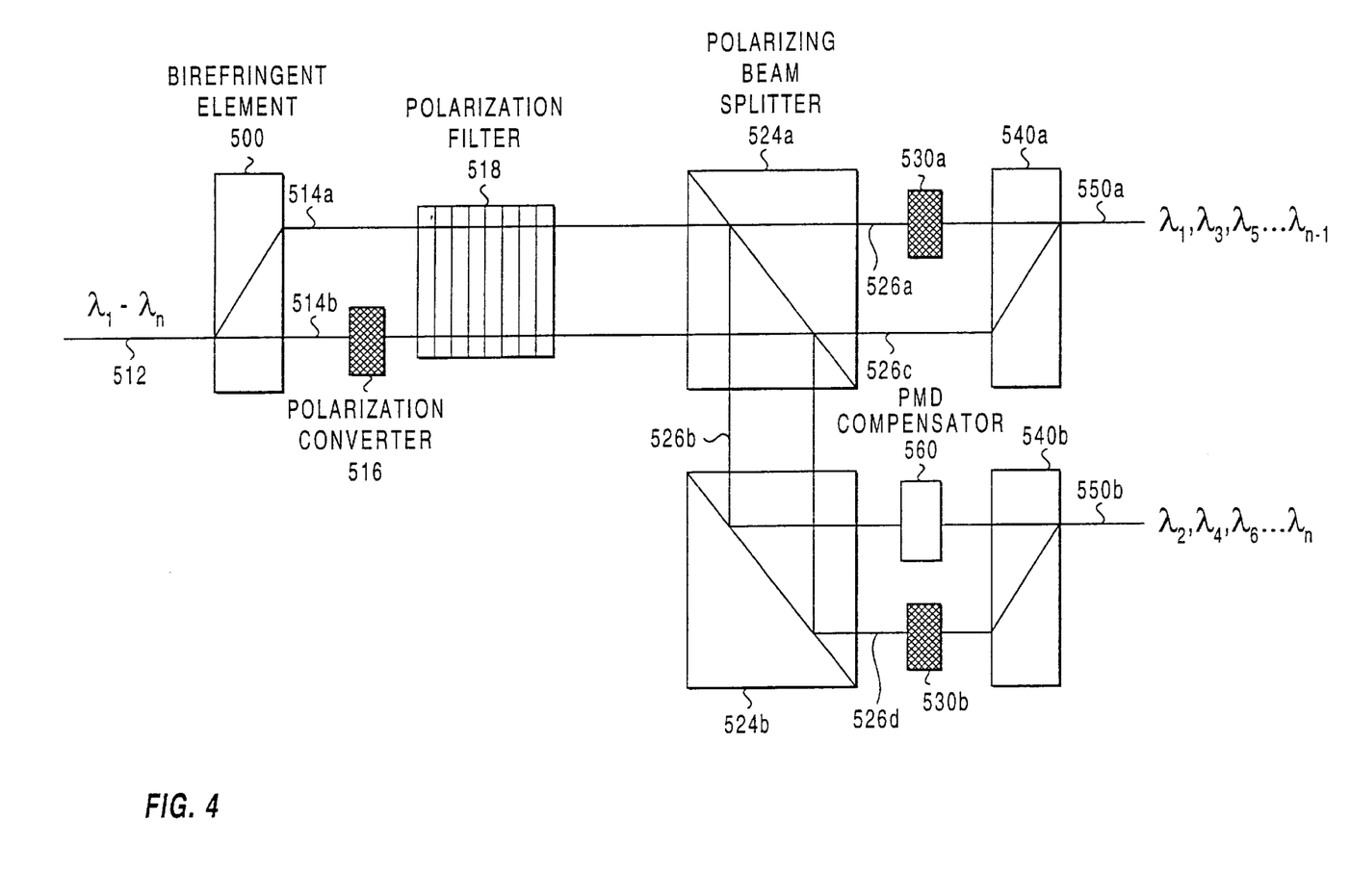
FIG. 4 illustrates a configuration for a wavelength slicer.

FIG. 4 illustrates a polarization-based wavelength multiplexing/demultiplexing device which can be used to realize the present invention. When used herein, the term flat-top slicer refers to such a polarization-based wavelength multiplexing/demultiplexing device or its equivalents. The flat-top slicer is employed as WDM-1 110. This device has been described in detail in U.S. patent application U.S. patent application Ser. No. 09/156,211 entitled "Programmable Optical Add/Drop Multiplexer," filed Sep. 17, 1998.

As shown in FIG. 4, an optical signal carrying eight optical channels 512 enters the system and is decomposed in a birefringent element 500 into two orthogonal polarization components, namely vertical and horizontal polarizations 514a and 514b respectively. One of the light paths 514b is passed through a polarization converter 516 such that both light paths have the same state of polarization (vertical or horizontal). These two beams then pass through a polarization filter 518 such that the odd-channels are coded with (output in) horizontal polarization and the even channels are coded with vertical polarization. These two polarizations are then separated by the following polarization beam separator (PBS), 524a, b which passes the horizontal polarization 526a, c straight through the PBS and deflects the vertical polarization 526b, d by 90°. Because the odd and even channels reside within the two polarizations respectively, they are spatially separated after the PBS.

In an alternate embodiment polarization filter 518 can be constructed to polarize code lower and higher channels differently, resulting in routing according to the channel position in the upper or lower parts of the input band.

Referring to FIG. 4 polarization converters 530a, 530b are used to convert polarizations by 90°, and birefringent elements 540a and 540b recombine the polarizations to produce odd numbered wavelengths at output port 550a and even numbered wavelengths at output port 550b. In a preferred embodiment polarization converters 530a, 530b are half wave plates.

Figure 5A:
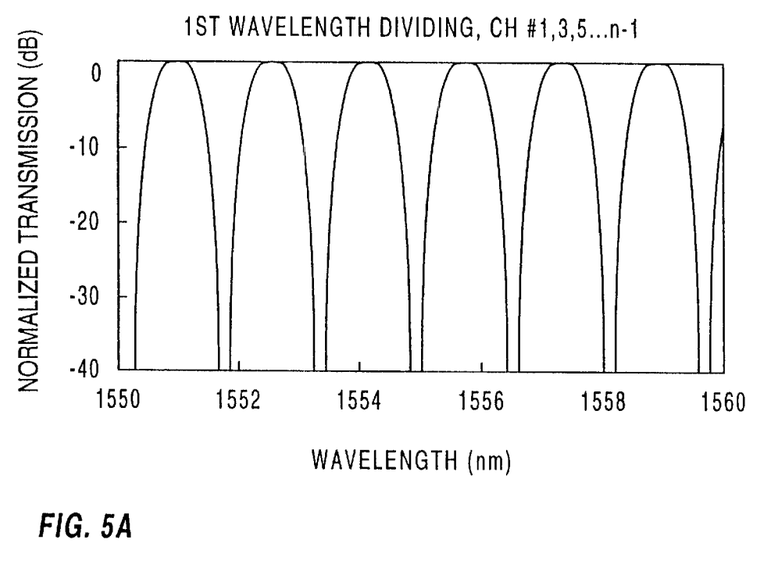
FIGS. 5a and 5b illustrate the spectral response for flat-top spectral slicers.
Figure 5B:
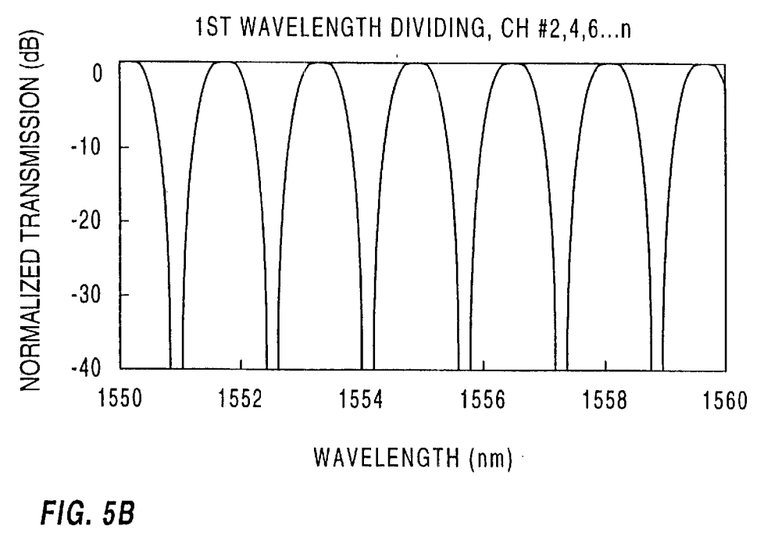

FIGS. 5A illustrates the transmission characteristics of polarization filter 518 for light with a first (e.g., vertical) polarization, and FIG. 5B illustrates transmission through the filter 518 of this embodiment for a second (e.g. horizontal) polarization. The transmission envelopes are shaped to provide sufficient width, as depicted, to tolerate expected wavelength drift while still being sufficiently narrow to achieve the necessary discrimination with respect to other channels. In one embodiment, suitable filters may be made as described in U.S. Pat. No. 5,694,233 entitled "Switchable Wavelength Router," or U.S. patent application Ser. No. 09/020,706 entitled "Temperature Insensitive Polarization Filter," both incorporated herein by reference.

A polarization mode dispersion compensator 560 can be used as illustrated in FIG. 4. Polarization mode dispersion is defined as the difference in the propagation time between the two orthogonal polarization components. In a polarization-based routing device, different propagation delays may occur between two routes. As illustrated in FIG. 4, the propagation times resulting from the propagation path in the through port (output port 550a) are equal for both polarizations. On the other port (output port 550b) one of the polarization beams 526d passes through two half-wave plates, while the other 526b does not. To minimize the difference in propagation times for these two beams, a polarization mode dispersion (PMD) compensator 560 is inserted into path 526b. In a preferred embodiment, an isotropic glass plate is used to realize PMD 560. Alternate materials can be used to realize PMD compensator 560 and are known to those skilled in the art.

Figure 6:
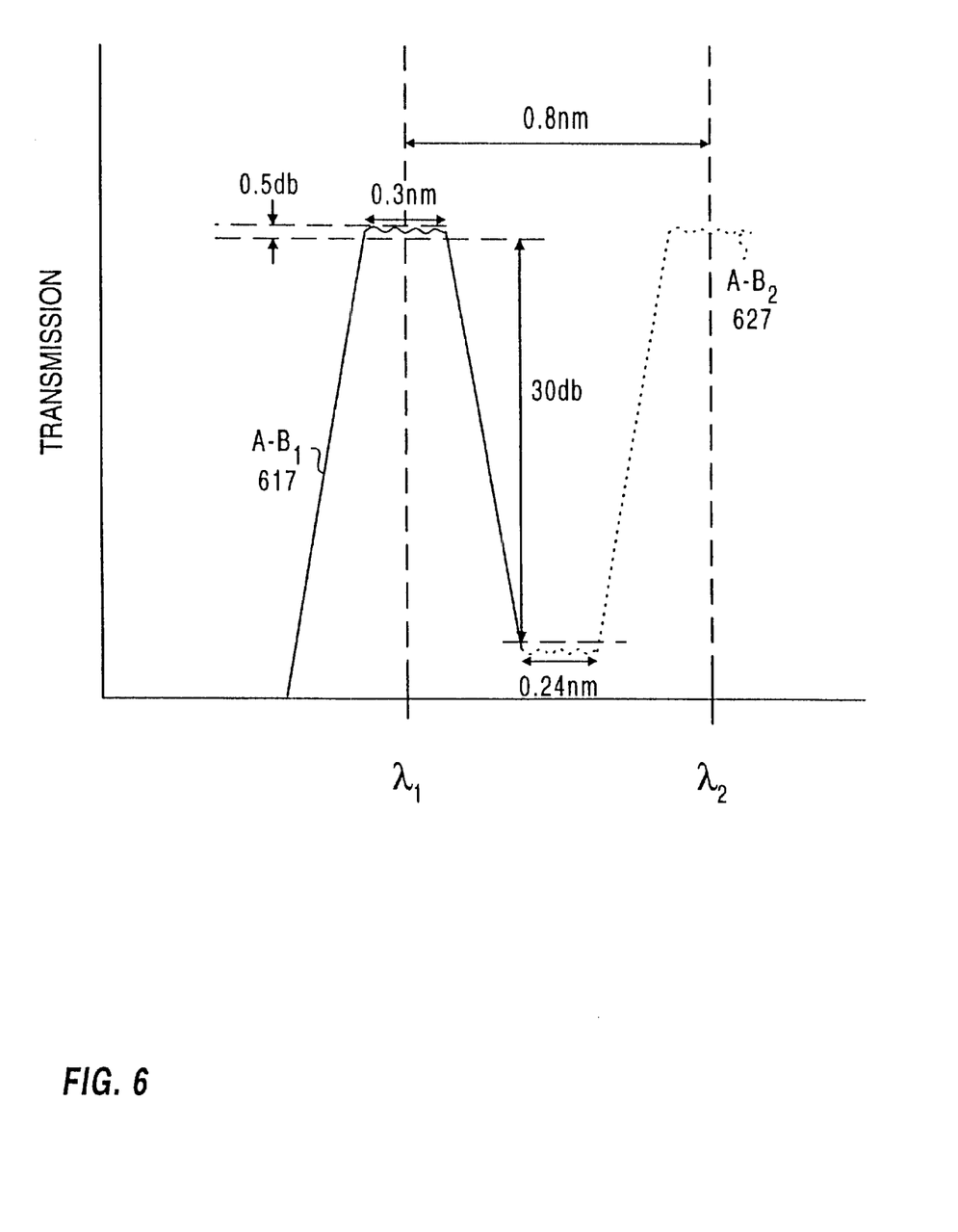
FIG. 6 illustrates a spectral response for a polarization-based wavelength separation device.

FIG. 6 illustrates in greater detail the transmission characteristics of a flat-top slicer when used with a channel spacing of 100 GHz (approximately 8 nm). At the transmission peak a flatness of 0.5 dB over a range of 0.3 nm can be obtained using a polarization filter in a polarization-based routing device. In terms of isolation, the transmission minimum can be 30 dB lower than the transmission value, and can remain that low over a 0.24 nm range between wavelength peaks. As a result, the flat-top slicer can tolerate wavelength drift and maintains low attenuation (high transmission) and low co-channel interference (low crosstalk). The solid portion 617 of the curve in FIG. 6 represents the transmission function from port A-B$_1$, while the dotted portion 627 represents the transmission function between ports A-B$_2$.

Figure 3:
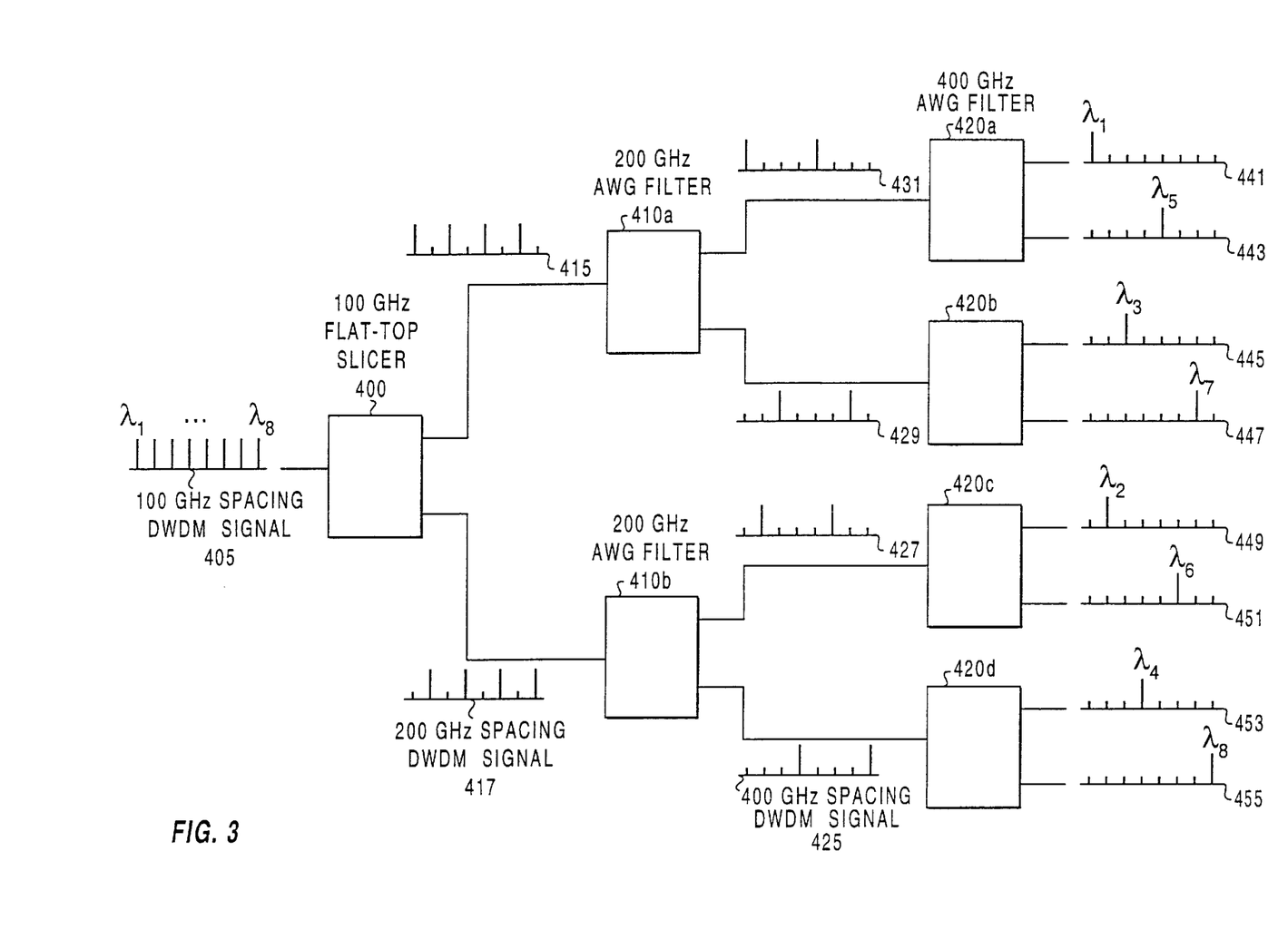
FIG. 3 illustrates a flat-top slicer followed by two stages of filters.

FIG. 3 illustrates an industrial application of the present invention in which a 100 GHz spaced dense wavelength division multiplexing (DWDM) signal 405 enters a 100 GHz flat-top slicer 400, which produces an odd-channel 200 GHz spacing DWDM signal 415 and an even channel 200 GHz spacing signal 417. Two 200 GHz filters 410a, 410b are used to produce a 400 GHz spaced signal carrying wavelengths $\lambda_1$ and $\lambda_5$ 431, a signal carrying wavelengths $\lambda_3$ and $\lambda_7$ 429, a signal carrying wavelengths $\lambda_2$ and $\lambda_6$ 427, and a signal carrying wavelengths $\lambda_4$ and $\lambda_8$ 425. A third stage of filters 420a–d are used to produce the individual channels $\lambda_1$ through $\lambda_8$ on outputs 441, 449, 445, 453, 443, 451, 447 and 455 respectively. By using a flat-top slicer as the first stage for wavelength separation, good isolation and tolerance to wavelength drift is obtained. Subsequent stages can be based on alternate technologies, since the wavelengths have been separated by one channel spacing in flat-top slicer 400. In an alternate embodiment, the subsequent stages can be based on flat-top slicers using polarization-based filters in a polarization multiplexing/demultiplexing device. In yet another embodiment, the second and third stages are combined in one device, which can be based on arrayed waveguide (AWG) or an alternate technology.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

We claim:

1. A method of processing an optical signal comprising a plurality of wavelengths, the method comprising:
    demultiplexing the optical signal according to a first transmission function to produce a first subset of wavelengths and a second subset of wavelengths; spatially separating the first and second subsets of wavelengths; and
    demultiplexing the first subset of wavelengths according to a second transmission function to produce at least a third subset of wavelengths and a fourth subset of wavelengths, wherein transmission peaks associated with at least the first subset of wavelengths are flatter and more isolated than transmission peaks associated with at least the third subset of wavelengths.

2. The method of claim 1 wherein the step of demultiplexing the optical signal is performed using a polarization-based wavelength routing device, the first subset of wavelengths are associated with a first polarization and the second subset of wavelengths are associated with a second polarization.

3. the method of claim 1 wherein the step of demultiplexing the first subset of wavelengths is performed by a selected one of an arrayed waveguide device, a fused biconical taper device, a diffraction grating device, a fiber Bragg grating device, a thin-film interference filter, or a polarization-based wavelength routing device.

4. A method of processing an optical signal comprising a plurality of wavelengths, the method comprising:
    demultiplexing the optical signal according to a first transmission function to produce a first subset of wavelengths and a second subset of wavelengths, wherein the first transmission function is defined by a first set of Fourier components;
    spatially separating the first and second subsets of wavelengths; and
    demultiplexing the first subset of wavelengths according to a second transmission function to produce at least a third subset of wavelengths and a fourth subset of wavelengths, wherein the second transmission function is defined by a second set of Fourier components;
    wherein a plurality of transmission peaks associated with at least the first subset of wavelengths are flatter than a plurality of transmission peaks associated with at least the third subset of wavelengths.

5. The method of claim 4, wherein:
    the step of demultiplexing the optical signal is performed using a polarization-based wavelength routing device;
    the first subset of wavelengths are associated with a first polarization; and
    the second subset of wavelengths are associated with a second polarization.

6. The method of claim 4, wherein the step of demultiplexing the first subset of wavelengths is performed by a selected one of an arrayed waveguide device, a fused biconical taper device, a diffraction grating device, a fiber Bragg grating device, a thin-film interference filter, or a polarization-based wavelength routing device.

7. The method of claim 4, wherein a plurality of transmission peaks associated with at least the first subset of wavelengths exhibit steeper roll-off than a plurality of transmission peaks associated with at least the third subset of wavelengths.

8. The method of claim 4, wherein a plurality of transmission peaks associated with at least the first subset of wavelengths exhibit higher isolation than a plurality of transmission peaks associated with at least the third subset of wavelengths.

9. A method of processing an optical signal comprising a plurality of wavelengths, the method comprising:
    demultiplexing the optical signal according to a first transmission function to produce a first subset of wavelengths and a second subset of wavelengths, wherein the first transmission function is defined by a first set of Fourier components;
    spatially separating the first and second subsets of wavelengths; and demultiplexing the first subset of wavelengths according to a second transmission function to produce at least a third subset of wavelengths and a fourth subset of wavelengths, wherein the second transmission function is defined by a second set of Fourier components;

wherein transmission peaks associated with at least the first subset of wavelengths exhibit steeper roll-off than transmission peaks associated with at least the third subset of wavelengths.

10. The method of claim 9, wherein:

the step of demultiplexing the optical signal is performed using a polarization-based wavelength routing device;

the first subset of wavelengths are associated with a first polarization; and the second subset of wavelengths are associated with a second polarization.

11. The method of claim 9, wherein the step of demultiplexing the first subset of wavelengths is performed by a selected one of an arrayed waveguide device, a fused biconical taper device, a diffraction grating device, a fiber Bragg grating device, a thin-film interference filter, or a polarization-based wavelength routing device.

12. The method of claim 9, wherein a plurality of transmission peaks associated with at least the first subset of wavelengths are flatter than a plurality of transmission peaks associated with at least the third subset of wavelengths.

13. The method of claim 9, wherein a plurality of transmission peaks associated with at least the first subset of wavelengths exhibit higher isolation than a plurality of transmission peaks associated with at least the third subset of wavelengths.

14. An apparatus for processing an optical signal comprising:

a first multiplexer operable to combine a first subset of wavelength channels and a second subset of wavelength channels according to a first transmission function to produce a third subset of wavelength channels, wherein the first transmission function is defined by a first set of Fourier components and is associated with a first spectral response; and a second multiplexer operable to combine the third subset of wavelength channels and a fourth subset of wavelength channels according to a second transmission function to produce a fifth subset of wavelength channels, wherein the second transmission function is defined by a second set of Fourier components and is associated with a second spectral response;

wherein the second spectral response exhibits flatter transmission peaks than the first spectral response.

15. The apparatus of claim 14, wherein the second multiplexer comprises a polarization-based wavelength routing device.

16. The apparatus of claim 14, wherein the first multiplexer comprises a selected one of an arrayed waveguide device, a fused biconical taper device, a diffraction grating device, a fiber Bragg grating device, a thin-film interference filter, or a polarization-based wavelength routing device.

17. The apparatus of claim 14, wherein the second multiplexer comprises:

a separation stage operable to separate the optical signal into a plurality of beam components;

a filter operable to change the polarization of the beam components based upon wavelength;

a routing stage operable to spatially separate the beam components based upon polarization; and a recombination stage operable to combine the beam components associated with the first subset of wavelengths.

18. An apparatus for demultiplexing an input optical signal having multiple wavelengths, said apparatus comprising:

a polarization-based wavelength routing device having:

(a) a polarization separation and conversion stage converting the input optical signal to a plurality of polarized beams;

(b) a wavelength-dependent polarization filter selectively changing the polarization of components of said polarized beams based on their wavelength, said wavelength-dependent polarization filter having a first transmission function with a first plurality of transmission peaks forming a first subset of wavelengths at a first polarization and a second subset of wavelengths at a second polarization orthogonal to the first polarization;

(c) a polarization routing stage spatially separating said components containing said first subset of wavelengths from components containing said second subset of wavelengths based on their polarizations; and (d) a polarization conversion and recombination stage combining said components containing said first subset of wavelengths; and a second wavelength routing device receiving said first subset of wavelengths and outputting a third subset of wavelengths and a fourth subset of wavelengths, wherein said second wavelength routing device has a second transmission function having a second plurality of transmission peaks wherein said first plurality of transmission peaks have substantially flatter peak transmissivities and higher isolation than said second plurality of transmission peaks.

19. The apparatus of claim 18 wherein said first subset of wavelengths includes every other wavelength in the input optical signal.

20. The apparatus of claim 18 wherein said first subset of wavelengths includes a lower set of wavelengths from the input optical signal.

21. The apparatus of claim 18 wherein the spacing of the wavelengths of said third subset of wavelengths is larger than the spacing of the wavelengths of the input optical signal by a factor of $2^N$.

22. The apparatus of claim 21 wherein N is equal to 2.

23. The apparatus of claim 18 wherein said wavelength-dependent polarization filter comprises a plurality of birefringent elements.

24. The apparatus of claim 18 wherein said wavelength-dependent polarization filter comprises a polarization fiber.

25. The apparatus of claim 18 wherein said wavelength-dependent polarization filter comprises a plurality of birefringent plates.

26. The apparatus of claim 25 wherein said plurality of birefringent plates comprise a crystalline material.

27. The apparatus of claim 26 wherein said crystalline material comprises calcite.

28. The apparatus of claim 18 wherein said polarization-based wavelength routing device further comprises a polarization mode dispersion compensator.

29. A method for demultiplexing an input optical signal having a plurality of wavelengths, said method comprising the step of:

converting the input optical signal to a plurality of beams having predetermined polarizations;

filtering the polarized beams using a wavelength-dependent polarization filter having a first transmission function with a first plurality of transmission peaks forming a first subset of wavelengths at a first polarization and a second subset of wavelengths at a second polarization orthogonal to the first polarization;

spatially separating the components of the filtered beams containing the first subset of wavelengths from the components of the filtered beams containing the second subset of wavelengths based on their polarizations;

combining the components containing the first subset of wavelengths; and demultiplexing the first subset of wavelengths to produce at least a third subset and a fourth subset of wavelengths using a wavelength demultiplexing device having a transmission function having a second plurality of transmission peaks, wherein the first plurality of transmission peaks have substantially flatter transmissions and higher isolation than the second plurality of transmission peaks.

30. The method of claim 29 wherein the first subset of wavelengths includes every other wavelength in the input optical signal.

31. The method of claim 29 wherein the first subset of wavelengths includes a lower set of wavelengths from the input optical signal.

32. The method of claim 29 wherein the spacing of the wavelengths of the third subset of wavelengths is larger than the spacing of the wavelengths of the input optical signal by a factor of $2^N$.

33. The method of claim 32 wherein N is equal to 2.

34. An apparatus for processing an optical signal, comprising:

a first demultiplexer operable to process the optical signal according to a first transmission function to produce a first subset of wavelengths and a second subset of wavelengths; and a second demultiplexer operable to process the first subset of wavelengths according to a second transmission function to produce a third subset of wavelengths and a fourth subset of wavelengths, wherein transmission peaks associated with at least the first subset of wavelengths are flatter and more isolated than transmission peaks associated with at least the third subset of wavelengths.

35. The apparatus of claim 34 wherein the first demultiplexer comprises a polarization-based wavelength routing device, the first subset of wavelengths are associated with a first polarization and the second subset of wavelengths are associated with a second polarization.

36. The apparatus of claim 34 wherein the second demultiplexer comprises a selected one of an arrayed waveguide device, a fused biconical taper device, a diffraction grating device, a fiber Bragg grating device, a thin-film interference filter, or a polarization-based wavelength routing device.

37. The apparatus of claim 34 wherein the first demultiplexer comprises:

a separation stage operable to separate the optical signal into a plurality of beam components;

a filter operable to change the polarization of the beam components based upon wavelength;

a routing stage operable to spatially separate the beam components based upon polarization; and a recombination stage operable to combine the beam components associated with the first subset of wavelengths.

38. The apparatus of claim 34 wherein at least one of the first and second demultiplexers are further operable to multiplex a plurality of subsets of wavelengths.

39. An apparatus for processing an optical signal comprising:

a first multiplexer operable to combine a first subset of wavelength channels and a second subset of wavelength channels according to a first transmission function to produce a third subset of wavelength channels; and a second multiplexer operable to combine the third subset of wavelength channels and a fourth subset of wavelength channels according to a second transmission function to produce a fifth subset of wavelength channels, wherein transmission peaks associated with the fifth subset of wavelength channels are flatter than transmission peaks associated with the third subset of wavelength channels.

40. The apparatus of claim 39 wherein the second multiplexer comprises a polarization-based wavelength routing device.

41. The apparatus of claim 39 wherein the first multiplexer comprises a selected one of an arrayed waveguide device, a fused biconical taper device, a diffraction grating device, a fiber Bragg grating device, a thin-film interference filter, or a polarization-based wavelength routing device.

42. The apparatus of claim 39 wherein the second multiplexer comprises:

a separation stage operable to separate the optical signal into a plurality of beam components;

a filter operable to change the polarization of the beam components based upon wavelength;

a routing stage operable to spatially separate the beam components based upon polarization; and a recombination stage operable to combine the beam components associated with the first subset of wavelengths.

43. A method of processing an optical signal comprising a plurality of wavelengths, the method comprising:

demultiplexing the optical signal according to a first transmission function to produce a first subset of wavelengths and a second subset of wavelengths, wherein the first transmission function is defined by a first set of Fourier components and is associated with a first spectral response;

spatially separating the first and second subsets of wavelengths; and demultiplexing the first subset of wavelengths according to a second transmission function to produce at least a third subset of wavelengths and a fourth subset of wavelengths, wherein the second transmission function is defined by a second set of Fourier components and is associated with a second spectral response;

wherein the first spectral response exhibits flatter transmission peaks than the second spectral response.

44. The method of claim 43, wherein:

the step of demultiplexing the optical signal is performed using a polarization-based wavelength routing device;

the first subset of wavelengths are associated with a first polarization; and the second subset of wavelengths are associated with a second polarization.

45. The method of claim 43, wherein the step of demultiplexing the first subset of wavelengths is performed by a selected one of an arrayed waveguide device, a fused biconical taper device, a diffraction grating device, a fiber Bragg grating device, a thin-film interference filter, or a polarization-based wavelength routing device.

46. The method of claim 43, wherein the first spectral response exhibits steeper roll-off from the transmission peaks than the second spectral response.

47. The method of claim 43, wherein the first spectral response exhibits higher isolation between the transmission peaks than the second spectral response.

48. A method of processing an optical signal comprising a plurality of wavelengths, the method comprising:

demultiplexing the optical signal according to a first transmission function to produce a first subset of wavelengths and a second subset of wavelengths, wherein the first transmission function is defined by a first set of Fourier components and is associated with a first spectral response;

spatially separating the first and second subsets of wavelengths; and demultiplexing the first subset of wavelengths according to a second transmission function to produce at least a third subset of wavelengths and a fourth subset of wavelengths, wherein the second transmission function is defined by a second set of Fourier components and is associated with a second spectral response;

wherein the first spectral response exhibits steeper roll-off from transmission peaks than the second spectral response.

49. The method of claim 48, wherein:

the step of demultiplexing the optical signal is performed using a polarization-based wavelength routing device;

the first subset of wavelengths are associated with a first polarization; and the second subset of wavelengths are associated with a second polarization.

50. The method of claim 48, wherein the step of demultiplexing the first subset of wavelengths is performed by a selected one of an arrayed waveguide device, a fused biconical taper device, a diffraction grating device, a fiber Bragg grating device, a thin-film interference filter, or a polarization-based wavelength routing device.

51. The method of claim 48, wherein the first spectral response exhibits flatter transmission peaks than the second spectral response.

52. The method of claim 48, wherein the first spectral response exhibits higher isolation between the transmission peaks than the second spectral response.

* * * * *